O. H. ESCHHOLZ.
AUTOMATIC CONTROL OF WELDING ARCS.
APPLICATION FILED AUG. 26, 1918.
1,320,127.
Patented Oct. 28, 1919.
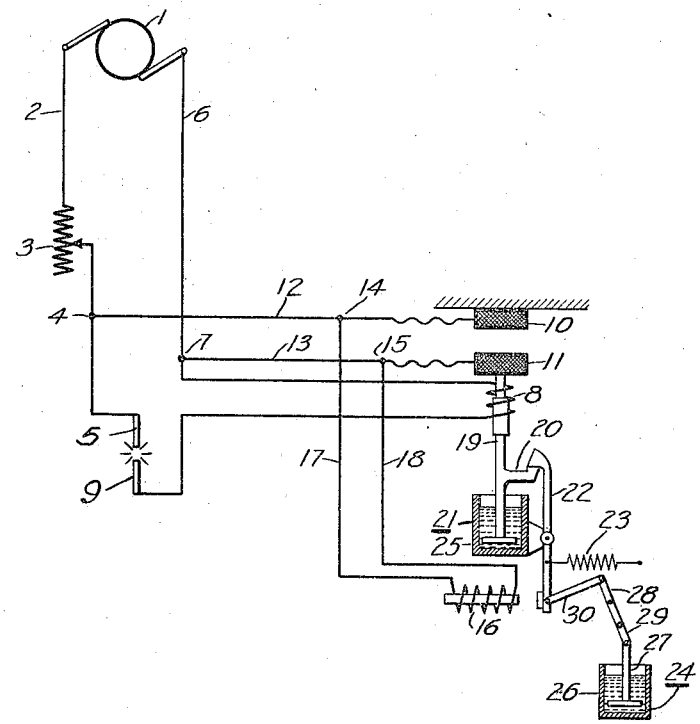
WITNESSES:
INVENTOR
Otto H. Eschholz
BY
ATTORNEY

UNITED STATES PATENT OFFICE.

OTTO H. ESCHHOLZ, OF WILKINSBURG, PENNSYLVANIA, ASSIGNOR TO WESTINGHOUSE ELECTRIC & MANUFACTURING COMPANY, A CORPORATION OF PENNSYLVANIA.

AUTOMATIC CONTROL OF WELDING ARCS.

1,320,127.  Specification of Letters Patent.  Patented Oct. 28, 1919.

Application filed August 26, 1918. Serial No. 251,383.

*To all whom it may concern:*

Be it known that I, OTTO H. ESCHHOLZ, a citizen of the United States, and a resident of Wilkinsburg, in the county of Allegheny and State of Pennsylvania, have invented a new and useful Improvement in Automatic Control of Welding Arcs, of which the following is a specification.

My invention relates to control systems for arc welding circuits, and it has for its primary object the provision of a control system which shall limit the arc length to a predetermined value.

It is well known by those familiar with arc welding that a short arc length reduces porosity and slag content in the finished weld. In view of this, one object of my invention is to provide a control system for arc welding circuits which will insure the employment of a short arc by automatically extinguishing the arc when it exceeds a certain length.

Another object of my invention is to provide a control system for arc welding circuits which may be employed with alternating current or direct current and with either a constant-current or constant-potential system.

A further object of my invention is to provide a control system by the employment of which less skill shall be required, on the part of the operator, to produce a good weld.

A still further object of my invention is to provide a control system by which the arc length may be accurately adjusted and maintained.

With these and other objects in view, my invention will be more fully described, illustrated in the drawing and then particularly pointed out in the appended claims.

In the single figure of the drawing is shown, diagrammatically, a welding circuit having a control system embodying my invention.

Referring to the drawing, 1 is a generator or source of electromotive force, one terminal of which is connected by a lead 2, having a variable resistance or reactance or both, as indicated at 3, and a junction point 4, to an electrode 5, the other terminal of the generator 1 being connected by a lead 6, having a junction point 7 and a switch-actuating coil 8, to an electrode 9. The above designated circuit constitutes the welding circuit. The contacts 10 and 11 may be connected to the junction points 4 and 7, respectively, by leads 12 and 13 having junction points 14 and 15, and a voltage trip coil 16 may be connected in parallel with the contacts 10 and 11 or electrodes 5 and 9 by leads 17 and 18 at the junction points 14 and 15. The contact 11 may be mounted upon the movable core 19, of the coil 8, which may have a projection 20 and a retarding device 21. A pivotally mounted latching lever 22 may have a spring 23 attached thereto and a retarding device 24. The retarding device 21 may be a dash-pot 25 for which the lower end of the core 19 may be the piston, and the retarding device 24 may be a dash-pot comprising a cylinder 26, and a piston 27 pivotally connected to a movable lever arm 28 by a link 29, the lever arm 28 being pivotally connected to the latching lever 22 by a link 30.

In practising my invention, a suitable current may be supplied by the generator 1 through the lead 2 and variable resistor 3 to the electrode or pencil 5, the electrode or article to be welded being connected to the other side of the generator 1 through the lead 6 and the coil 8. An arc may be established between the electrodes 5 and 9 in the usual manner, by bringing them into contact and then slowly separating them. When the arc is established, the coil 8 will be energized. The contacts 10 and 11 are normally separated and are held in such relation by the latching lever 22 and spring 23. The trip coil 16 is adapted to attract the lower part of the latching lever 22 against the action of the spring 23 and, when sufficient attractive force is exerted, it will release the core 19. The attractive force may be calculated and adjusted for a value to act when the arc is drawn to a certain length and the voltage across the arc is so increased that the force exerted by the trip coil controlled by this voltage will be sufficient to release the core 19 against the action of the spring 23. The coil 8, continuously being active while the welding circuit is energized, tends to force the contacts into engagement and when the core 19 is released by the action of the trip coil 16, the contacts will be brought together to short circuit the arc.

When the arc is short circuited, it is extinguished, and the voltage across the electrodes 5 and 9 will, therefore, be zero and, consequently, the voltage energizing the trip coil 16 will also be practically zero. The latching lever 22 will, therefore, be released and will return to its original position on account of the force exerted by the spring 23. The contact 11 of the core 19 returns to its original position immediately after the arc is extinguished, on account of the switch-actuating coil 8 being deënergized. The whole system will, therefore, be in its initial state and in condition for reëstablishing the arc between the electrodes 5 and 9. The retarding devices 21 and 24 may be employed but are not necessary in all instances, their use being governed by the nature of the welding circuit. Also, if a generator having inherent arc-stabilizing characteristics is employed, the external stabilizing means 3 will not be required.

Although I have described specifically a control system embodying my invention, it is obvious that minor changes may be made in this construction without departing from the spirit thereof and I desire, therefore, that no limitations shall be imposed except such as are indicated in the appended claims.

I claim as my invention:

1. The combination with an arc welding circuit, of a short-circuiting switch, means always tending to close said switch when the welding circuit is energized, and arc-voltage-controlled means for holding it open.

2. The combination with an arc welding circuit, of a short-circuiting switch, a switch-actuating coil always tending to close the short-circuiting switch when the welding circuit is energized, and arc-voltage-controlled means for holding it open.

3. The combination with an arc welding circuit, of a short-circuiting switch therefor, an arc-voltage-controlled means normally serving to hold the switch open, and means tending to close the switch at all times when the welding circuit is energized but permitting it to open when the welding circuit is deënergized.

4. The combination with an arc welding circuit, of a short-circuiting switch therefor, an arc-voltage-controlled latch normally serving to hold the switch open, and a switch-actuating coil tending to close the short-circuiting switch at all times when the welding circuit is energized but permitting it to open when the welding circuit is deënergized.

5. The combination with an arc welding circuit, of a control system comprising means for automatically short circuiting the arc when it exceeds a predetermined length, said means including a short-circuiting switch, a switch-actuating coil energized by the arc current and a switch releasing trip coil governed by the arc voltage.

6. The combination with an arc welding circuit, of a control system comprising means for automatically short circuiting the arc when it exceeds a predetermined length, said means including a short-circuiting switch, a switch-actuating coil energized by the arc current and in series with the arc and a switch-releasing trip coil governed by the arc voltage.

7. The combination with an arc welding circuit, of a control system comprising means for automatically short circuiting the arc when it exceeds a predetermined length, said means including a short-circuiting switch, a retarding device therefor, a switch-actuating coil energized by the arc current and in series with the arc, and a switch-releasing trip coil governed by the arc voltage.

8. The combination with an arc welding circuit, of a control system comprising means for automatically short circuiting the arc when it exceeds a predetermined length, said means including a normally open, latch-held, short-circuiting switch, a retarding device therefor, a switch-actuating coil energized by the arc current and in series with the arc, and a latch-releasing trip coil governed by the arc voltage and in parallel with the arc.

9. The combination with an arc welding circuit, of a control system comprising means for automatically short circuiting the arc when it exceeds a predetermined length, said means including a short-circuiting switch, a retarding device therefor, a latch adapted to hold the short-circuiting switch in its normally open position, a retarding device therefor, a switch-actuating coil energized by the arc current and in series with the arc, and a latch-releasing trip coil governed by the arc voltage and in parallel with the arc.

In testimony whereof, I have hereunto subscribed my name this 22nd day of August, 1918.

OTTO H. ESCHHOLZ.